United States Patent
Chubachi et al.

(10) Patent No.: US 7,019,899 B2
(45) Date of Patent: Mar. 28, 2006

(54) SCREEN, OPTICAL FILM, AND METHOD OF MANUFACTURING AN OPTICAL FILM

(75) Inventors: Hideya Chubachi, Tokyo (JP); Masayasu Kakinuma, Kanagawa (JP); Hiroshi Hayashi, Kanagawa (JP); Kazuhito Shimoda, Kanagawa (JP); Tomoharu Mukasa, Saitama (JP); Shina Kuriki, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/135,073

(22) Filed: May 23, 2005

(65) Prior Publication Data

US 2005/0219691 A1   Oct. 6, 2005

Related U.S. Application Data

(62) Division of application No. 10/760,744, filed on Jan. 20, 2004.

(30) Foreign Application Priority Data

Jan. 23, 2003 (JP) .............................. 2003-014505

(51) Int. Cl.
*G03B 21/60* (2006.01)

(52) U.S. Cl. ...................... 359/455; 359/452; 359/456

(58) Field of Classification Search ................ 359/443, 359/449–451, 454, 455, 456, 459, 460, 452
See application file for complete search history.

(56) References Cited

U.S. PATENT DOCUMENTS

| | | | | |
|---|---|---|---|---|
| 4,708,435 A | * | 11/1987 | Yata et al. ................... | 359/456 |
| 5,196,960 A | * | 3/1993 | Matsuzaki et al. .......... | 359/453 |
| 6,317,263 B1 | * | 11/2001 | Moshrefzadeh et al. .... | 359/443 |
| 6,597,502 B1 | * | 7/2003 | Takahashi et al. .......... | 359/456 |
| 6,700,702 B1 | * | 3/2004 | Sales .......................... | 359/443 |

* cited by examiner

*Primary Examiner*—W. B. Perkey
*Assistant Examiner*—Andrew Sever
(74) *Attorney, Agent, or Firm*—Robert J. Depke; Trexler, Bushnell, Giangiorgi, Blackstone & Marr, Ltd.

(57) ABSTRACT

There is provided a screen, which, with a simple configuration, is capable of effectively utilizing light projected thereon and realizing an even luminance distribution on the screen. This screen has a diffusion layer whose diffusion characteristic expressed as a luminance distribution with respect to a scattering angle of incident light incident at an angle of 0° is varied such that the peak position of the luminance distribution is shifted towards a greater value of scattering angle in the direction of the central portion of the screen the greater the distance from the central portion of the screen is. The present invention also provides an optical film suitable for use in such a screen, and a manufacturing method therefor.

3 Claims, 14 Drawing Sheets

SCREEN, OPTICAL FILM, AND METHOD OF MANUFACTURING AN OPTICAL FILM

The subject matter of application Ser. No. 10/760,744 is incorporated herein by reference. The present application is a divisional of U.S. application Ser. No. 10/760,744, filed Jan. 20, 2004, which claims priority to Japanese Patent Application No. JP2003-014505, filed Jan. 23, 2003. The present application claims priority to these previously filed applications.

CROSS REFERENCE TO RELATED APPLICATIONS

The present document claims priority to Japanese Priority Document JP 2003-014505, filed in the Japanese Patent Office on Jan. 23, 2003, the entire contents of which are incorporated herein by reference to the extent permitted by law.

BACKGROUND OF THE INVENTION

1. Field of the Invention

The present invention generally relates to a screen, an optical film, and a method of manufacturing an optical film.

2. Description of the Related Art

In recent years, overhead projectors and slide projectors have been widely used by speakers at meetings as means for presenting data. Video projectors and motion-picture film projectors, which use liquid crystal panels, have become popular in ordinary households. These projectors employ the following projecting method. Light outputted from a light source is light-modulated by, for example, a transmissive crystal panel to thereby obtain image light. This image light is emitted therefrom through an optical system, such as a lens, and projected onto a screen.

For example, a projector that is capable of forming a color image on a screen has an illuminating optical system for separating light emitted from a light source into red (R), green (G) and blue (B) light fluxes and for focusing each of the R, G, and B light fluxes in a predetermined light path. The projector also has a liquid crystal panel (or light valve) for light-modulating each of the R, G, and B light fluxes separated by this illuminating optical system, and a light synthesis section for synthesizing the R, G, and B light fluxes light-modulated by the liquid crystal panel. A color image synthesized by the light synthesis portion is enlarged and projected onto a screen by a projection lens.

Recently, there has been developed a projector apparatus of the type that spatially modulates each of the R, G, and B light fluxes by using a narrowband three-primary-color light source as a light source and a grating light valve (GLV) in place of a liquid crystal panel.

In order to view an image projected by the above-mentioned projector apparatus, a projector screen is used. Projector screens can be broadly classified into front projector screens, which has projection light irradiated thereon from the front side thereof and with which the reflected light is viewed by a user, and a rear projector screen, which has projection light irradiated thereon from the rear side thereof and with which the transmitted light is viewed by a user from the front side thereof. Of both the front projector screen and the rear projector screen is demanded a wide viewing angle with good visibility.

Therefore, generally, each of the front projector screen and the rear projector screen has a diffusion layer for scattering light, which is provided on the surface thereof.

The diffusion characteristics of the diffusion layer are the same at the center of the screen as they are in the periphery. The term "diffusion characteristics" as used herein refers to, taking the front projector screen as an example, the characteristics representing the luminance for each scatter angle component of reflection light D91 that is scattered when light is incident upon a certain part O on a screen 91 from the direction of the normal to the surface of the screen 91 (that is, the direction at an angle of 0°) as shown in FIG. 18A. In the present application, the diffusion characteristics are expressed by having the horizontal axis represent the scatter angle of reflection light, with the direction of the normal to the surface of the screen (that is, the front direction of the screen) taken to be 0°, and by having the vertical axis represent luminance. For instance, the diffusion characteristics of a conventional front projector screen are such that the angle at which the luminance of reflection light is greatest is 0° at any part of the screen as shown in FIG. 18B. The diffusion characteristics of the rear projector screen can be expressed in a similar manner.

The diffusion characteristics in the conventional front projector screen are uniform across the entire screen. Therefore, when the screen gain thereof is increased, the difference in luminance between a central part 91b and the peripheral parts 91a and 91c increases as shown in FIG. 19. Thus, the image projected thereon would be bright at the central part 91b, but darker at the peripheral parts 91a and 91c. In other words, because the incident angle of the projector light on the central part 91b of the screen 91 is 0°, an angular component R91b, whose light intensity is larger than any other angular components of reflection light, is reflected to the side of a viewer 96. However, at each of the peripheral parts 91a and 91b of the screen 91, the incident angle of the projector light is not 0°. Thus, among the angular components of the reflection light, the angular component having the largest light intensity is reflected outward from the screen 91, and only angular components R91a and R91c having a smaller light intensity are reflected to the side of the viewer 96.

This tendency is also present in rear projector screens. As shown in FIG. 20, the projected image is brighter at a central part 92b, but darker at peripheral parts 92a and 92c.

Various studies have been conducted on the issue of luminance-difference of the screens described above. For example, there has been proposed a front projector screen whose luminance difference is improved by gradually increasing the surface irregularities of the reflection layer thereof from the center towards the periphery, thereby gradually increasing the degree of scattering of the reflected light the closer it gets to the periphery of the screen (see, for instance, Japanese Patent Application Publication No. Hei-10-142699, paragraphs [0016] to [0036], and FIG. 1).

There has also been proposed another screen that includes a group of pairs of mirrors at right angles and in which an even luminance distribution across the screen is achieved by adjusting the angle of inclination of each pair of mirrors (see, for example, Japanese Patent Application Publication No. 2000-162710, paragraphs [0010], [0011], and FIG. 8).

Although the luminance distribution is improved in the front projector screen above in which the surface irregularities of the reflection layer are adjusted, at the peripheral portions, the angular component, whose intensity of reflection light is greatest, is still directed outward. Therefore, there is a considerable amount of reflection light that does not contribute to viewing, light from the projector cannot be used effectively, and consequently, it is difficult to enhance the overall luminance.

Further, in the front projector screen above in which the inclination angle of each pair of mirrors is adjusted, the luminance distribution in the horizontal direction can be made even. However, the luminance distribution in the vertical direction cannot be made even for structural reasons.

SUMMARY OF THE INVENTION

The present invention is made in view of the problems and issues with the related art, and attempts to provide an optical film and a screen with a simple structure, with which projector light can be utilized effectively and the luminance distribution of the screen can be made uniform, and to provide a method of manufacturing such an optical film.

A screen related to a first embodiment of the present invention for displaying an image thereon may include a diffusion layer having such diffusion characteristics, which are expressed in terms of the luminance distribution with respect to the scattering angle of incident light whose incident angle is 0°, that the greater the distance from the central portion of the screen, the more the peak position of the luminance distribution is shifted towards greater values of scattering angle in the direction of the central portion of the screen.

Thus, the angular component of scattered light that has high luminance and is radiated from the screen can be directed to a viewer positioned in front of the screen at all parts of the screen surface, and the luminance distribution of the screen can be made even while effectively utilizing the light projected from the projector.

In addition, even when a projector having a low luminance is used, a viewer can view high-contrast and clear images. Further, even when a projector having an average luminance is used, a viewer can view clear images in a brightly lit room.

The adjustment of the peak position of the luminance distribution may be performed by continuously changing the peak position of the luminance distribution so that it is shifted to a greater value of scattering angle in the direction of the center portion of the screen. Alternatively, the adjustment may be performed by dividing the screen evenly in the horizontal and vertical directions into a plurality of areas, and then fitting screen panels, comprised of a diffusion layer having the same diffusion characteristics within each of the areas, into each of the areas, and varying the diffusion characteristics between these areas so that the extent to which the peak position is shifted to greater values of scattering angle in the direction of the center portion of the screen is larger at the peripheral portions than it is at the center portion. It is necessary that the size of each of the areas be small enough so that the luminance difference between the areas will not be noticeable.

In a screen related to a second embodiment of the present invention, the diffusion layer may have a plurality of convex or concave parts, which are provided on the surface thereof, each having slopes for scattering image light. The gradient of the slope that is closer to the central portion of the screen increases the further away the convex or concave parts are from the central portion of the screen.

Thus, it is made possible to adjust the distribution of the diffusion characteristics of the screen surface. The direction of the scattered light can be controlled according to the position on the surface of the screen. Consequently, the luminance distribution of the screen can be made even while effectively utilizing the light projected from the projector. Thus, the light scattered to the front of the screen can be increased and the light scattered outward from the peripheral portions, at which the incident angle of incident light projected thereon from the projector is greater, reduced, thereby reducing the unevenness of luminance caused by the difference in the incident angle of the projector light.

In a screen related to a third embodiment of the present invention, the size of each of the convex or concave parts in the second embodiment above and the interval therebetween are made smaller than the size of a pixel.

Thus, it becomes possible to make the distribution of luminance even while making the screen one that has good visibility.

In a screen related to a fourth embodiment of the present invention, there may further be provided, in addition to what is provided in the first embodiment above, a reflective layer for reflecting image light.

Thus, a front projector screen in which the luminance distribution on the screen is made even while effectively utilizing the projector light can be obtained. In other words, by being provided with the reflective layer, a projector screen whose luminance is less uneven can be obtained.

In the present invention, the diffusion layer may be formed on the reflective layer. Conversely, the reflective layer may be formed on the diffusion layer.

In addition, the kind of the material for the reflective layer is not limited to any specific material in particular, as long as the material allows for the reflective film to be formed in a layer. An aluminum reflective film formed by evaporation is used in the present invention, for example.

In a screen related to the fifth embodiment of the present invention, the reflective layer in the fourth embodiment is made to have highly reflective properties for light in a specific wavelength range corresponding to image light. The reflective layer has highly transmissive properties or highly absorptive properties at least for light in the visible wavelength range except for the specific wavelength range mentioned above.

Thus, a front projector screen whose luminance distribution on the screen is even, for example, in a case where light is projected onto the screen from a diffraction grating projector that uses a grating light valve (GLV) can be obtained. The front projector screen enables a viewer to view high-contrast images with less interference from external light.

In a screen related to a sixth embodiment of the present invention, the reflective layer of the fifth embodiment mentioned above may be comprised of a multilayer film in which high refractive index layers and low refractive index layers, whose refractive index is lower than that of the high refractive index layers, are alternately layered.

By thus designing a reflective layer for a predetermined light source, the reflective property and the transmissive property of the screen can be controlled. Consequently, a viewer can view high-contrast images that correspond to light in the desired wavelength range, and whose luminance distribution on the screen is even.

A screen related to the seventh embodiment of the present invention further includes, in addition to what the fifth embodiment is equipped with, an absorption layer for absorbing light transmitted through the reflective layer.

Thus, a viewer can view high-contrast images while the luminance distribution on the screen is made even.

According to the screens related to the fifth to seventh embodiments of the present invention, by providing a reflective layer that selectively reflects light of the wavelength range of the projected light, the influence of external light can be reduced. Thus, a front projector screen that is capable of displaying high-contrast high-luminance images under bright lights without an uneven luminance distribution can be obtained.

A screen related to the eighth embodiment of the present invention further includes, in addition to what is provided in the first embodiment above, a selectively absorptive layer, which has a highly transmissive property for light of a specific wavelength range corresponding to image light, and which has a highly absorptive property for at least light in the visible wavelength range outside of the specific wavelength range mentioned above.

Thus, a rear projector screen whose luminance distribution on the screen is even, for instance, in a case where light is projected onto the screen from a diffraction grating projector that uses a grating light valve (GLV) can be obtained. The rear projector screen enables a viewer to view high-contrast images.

In a screen related to the ninth embodiment of the present invention, the selectively absorptive layer of the eight embodiment may contain a selective absorptive dye, which has a highly absorptive property for light of a predetermined wavelength range outside of the specific wavelength region mentioned above, and which has a highly transmissive property for light that is not in the predetermined wavelength range mentioned above.

By thus designing a selective absorptive layer for a predetermined light source, the absorptive property and the transmissive property of the screen can be controlled. Consequently, a viewer can view high-contrast images that correspond to light in the desired wavelength range, and whose luminance distribution on the screen is even.

A screen related to the tenth embodiment of the present invention further includes, in addition to what the ninth embodiment is provided with, a reflective layer for reflecting light transmitted through the selectively absorptive layer mentioned above.

Thus, a front projector screen in which the selectively absorptive layer serves as an optical filter, the luminance distribution on the screen is even, and with which a viewer is able to view high-contrast images can be obtained.

According to the tenth embodiment of the present invention, by providing the reflective layer that reflects light transmitted through the selectively absorptive layer, a front projector screen which is capable of displaying high-contrast and high-luminance images under bright lights with less unevenness in the luminance distribution can be obtained.

A screen related to the eleventh embodiment of the present invention is the screen of the fifth or eighth embodiment, where the specific wavelength range mentioned therein includes a red light wavelength range, a green light wavelength range, and a blue light wavelength range.

Thus, a front projector screen or a rear projector screen, which realizes an even luminance distribution on the screen for light from an RGB light source, and which enables a viewer to view high-contrast images is obtained.

An optical film related to another aspect of the present invention, which will be referred to as the first embodiment of an optical film, may include a diffusion layer having such diffusion characteristics, which are expressed as a luminance distribution with respect to the scattering angle of incident light that is incident at an incident angle of 0°, that the further away from the central portion of the film it is, the more the diffusion characteristics are altered so that the peak position of the luminance distribution is shifted towards greater values of scattering angle in the direction of the central portion of the film.

By using this optical film in a screen, the angular component, whose luminance is high, of scattered light radiated from the optical film can be directed in a direction perpendicular to the screen, and the luminance distribution on the screen is made even while effectively utilizing the light projected from the projector.

The optical film may be formed directly on the optical thin film of the screen. Alternatively, this film may be formed on a substrate before being placed on the optical thin film.

The adjustment of the peak position of the luminance distribution may be performed by continuously changing the peak position of the luminance distribution so that it is shifted towards a greater value of scattering angle in the direction of the central portion of the film. Alternatively, the adjustment may be performed by dividing the optical film evenly in the horizontal and vertical directions into a plurality of areas, and then making the diffusion layer be such that, within each of the areas, the diffusion characteristics are uniform, but varying the diffusion characteristics between the areas so that the extent to which the peak position is shifted to greater values of scattering angle in the direction of the central portion of the film is larger at the peripheral portions than it is at the central portion.

An optical film related to a second embodiment of the optical film of the present invention is one in which the diffusion layer of the optical film of the first embodiment further includes a plurality of convex or concave parts on its surface, each having slopes for scattering image light. The gradient of the slopes that are closer to the central portion of the film increases the further away the convex or concave parts are from the central portion of the film.

Thus, the adjustment of the distribution of the diffusion characteristics of the surface of the optical film is made possible. The direction of the scattered light can be controlled according to the position on the surface of the optical film. Consequently, by using this optical film in a screen, the luminance distribution on the screen is made even while effectively utilizing the light projected from the projector. In other words, according to the optical films related to the first and second embodiments of the present invention, by varying the diffusion characteristics in accordance with the distance from the central portion of the optical film, more of the light emitted from a point facing the center position of the screen can be diffused to the front thereof. Consequently, an optical film that is effective in reducing the unevenness of the luminance distribution on the screen can be obtained.

A method of manufacturing an optical film related to another aspect of the present invention, which will be referred to as the first embodiment of a method of manufacturing an optical film, may include the steps of forming a transparent resin layer on a substrate, and forming a plurality of convex parts or concave parts by performing embossing on the formed transparent resin layer so that the position of the luminance peak of the diffusion characteristics, which are expressed in terms of the luminance distribution with respect to the diffusion angle of incident light that is incident at an angle of 0°, is shifted towards greater values of diffusion angle in the direction of the central portion of the film the further away the convex or concave parts are from the central portion of the film.

This manufacturing method facilitates the manufacture of an optical film, whose diffusion characteristics are adjusted.

The transparent resin to be used is not limited to any in particular as long as the transparent resin has transmissive properties for light in the wavelength range of the light that is used. This resin may be either a thermosetting resin or a thermoplastic resin. Alternatively, this resin may be a UV curable resin, in which case the optical film can be manufactured easily and which is thus preferable.

A method related to the second embodiment of the present invention of the method of manufacturing an optical film is such that the shape of each of the convex or concave parts in the first embodiment of the method above changes so that the gradient of the slopes that are closer to the central portion of the film increases the further away they are from the central portion of the film.

This manufacturing method facilitates the adjustment of the distribution of diffusion characteristics of the surface of the optical film. Thus, the direction of the scattered light can be controlled according to the position on the surface of the optical film. By using this optical film in a screen, the luminance distribution on the screen is made even while effectively utilizing the projector light. In other words, in the first and second embodiments of the method of the present invention, by forming, through embossing, the concave and convex surfaces, whose diffusion characteristics vary according to the distance from the central portion of the screen, more of the light emitted from a point facing the central portion of the screen can be scattered to the front thereof at any position on the screen, and consequently the manufacture of an optical film that is effective in reducing the unevenness of the luminance distribution on a screen is made easier.

DETAILED DESCRIPTION OF THE PREFERRED EMBODIMENTS

Hereinafter, a front projector screen related to a first embodiment of the present invention is described with reference to the accompanying drawings. It is to be noted, however, that the configuration described below is merely an example, and the present invention is not limited thereto.

Figure 1:
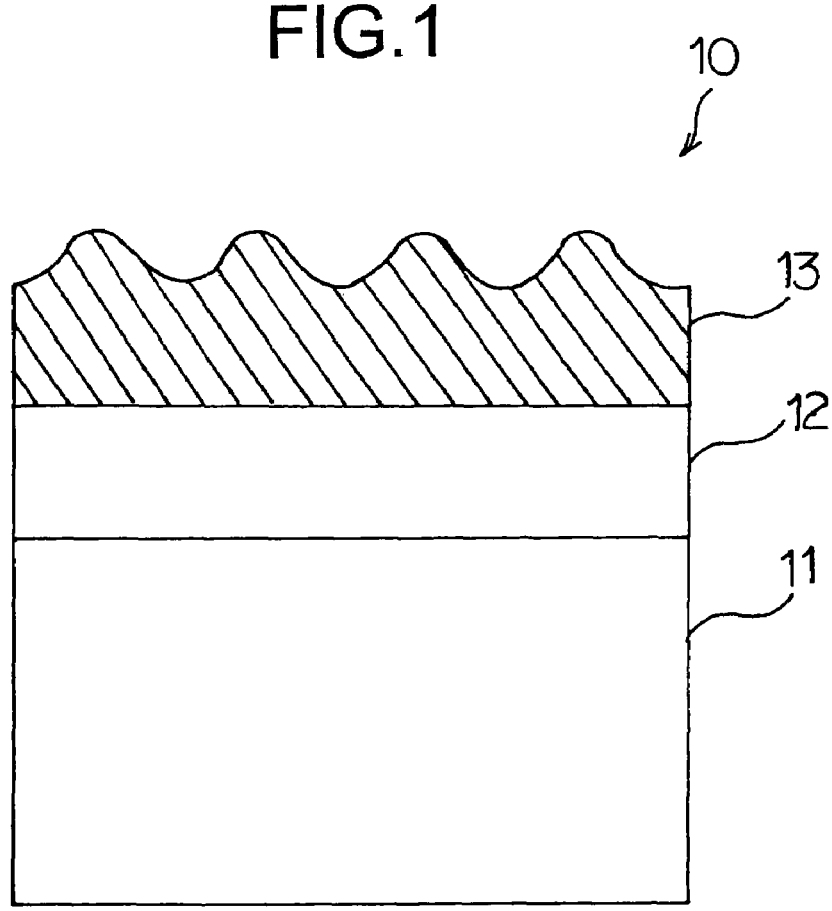
FIG. 1 is a sectional view showing the configuration of a front projector screen related to an embodiment of the present invention.

FIG. 1 is a sectional view showing a configuration related to the first embodiment of the present invention. As shown in FIG. 1, a front projector screen 10 has a reflective layer 12 provided on a screen substrate 11, and a diffusion layer 13 provided thereon.

The screen substrate 11 is a support member of the front projector screen. Various materials may be used for the screen substrate 11, as long as the material has strength sufficient for use as a screen. For example, such a material may include polymers, such as polyethylene terephthalate (PET), polyethylene naphthalate (PEN), polyether sulfone (PES), and polyolefin (PO).

The reflective layer 12 has the function of reflecting light projected from a projector. Metal materials with high reflectance, such as aluminum, and materials that reflect light, such as photoluminescent pigments, may be used for the reflective layer 12. This reflective layer 12 can be formed on a surface of the screen substrate 11 by evaporation or by coating. Alternatively, a metal thin film, a metal plate, or a metal evaporated film may be placed on the screen substrate 11. Alternatively, the screen substrate 11 may be formed of a reflective material.

The diffusion layer 13 scatters the light that is reflected by the reflective layer 12 to obtain scattered light. The diffusion layer 13 may be made of a light-transmissive material, such as resin, for example. A viewer can view a natural image by observing the scattered reflection light.

<Diffusion Layer>

Hereinafter, the diffusion layer serving as an optical film is described in more detail.

Figure 2:
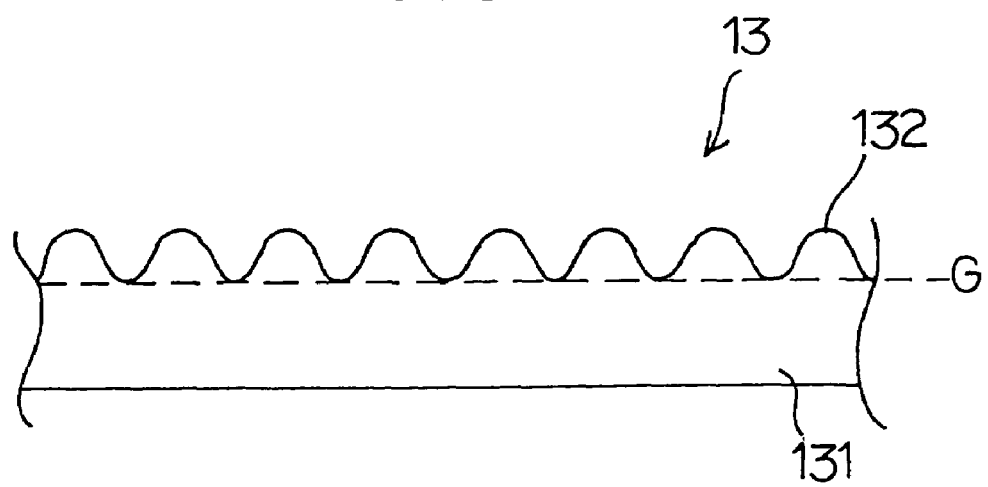
FIG. 2 is a sectional view showing a diffusion layer of a front projector screen related to an embodiment of the present invention.

FIG. 2 is a sectional view showing the configuration of the diffusion layer 13 provided at the central part of the front projector screen 10.

The surface on one side of the diffusion layer 13 has concave and convex parts. This, for example, may be seen as a configuration in which the diffusion layer 13 has a plurality of convex parts 132 on a surface G of a flat layer 131. This flat layer 131 and the convex parts 132 are made of the same material, such as an epoxy resin.

Figure 3A:
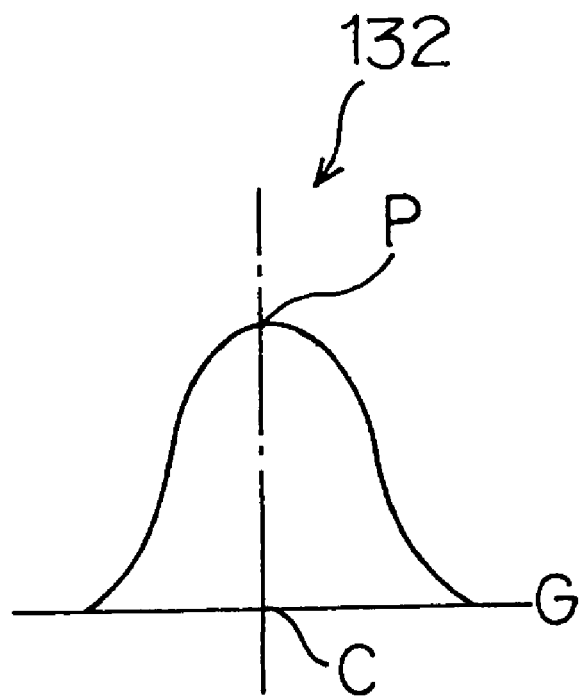
FIGS. 3A and 3B are a side view and a plan view, respectively, showing the shape of a convex part of a diffusion layer related to the present invention.
Figure 3B:
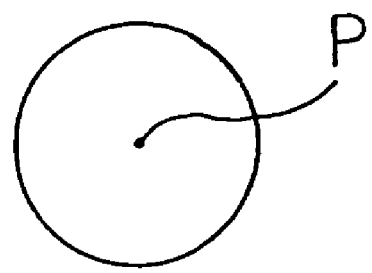

This convex part 132 has a section shaped like a laterally symmetrical chevron having a vertex P, as shown in, for instance, FIG. 3A. The gradient of a slope of the convex portion 132 is the same at any section of the convex part 132. This gradient is taken to be a reference gradient. As shown in FIG. 3B, the shape of the convex part 132 is circular when observed from above. In other words, the virtual cross-section of a bottom surface portion of the convex part 132 along plane G is circular. The normal to the bottom surface from the vertex P passes through a center C of the bottom surface.

The convex parts 132 each having the above-mentioned shape are formed with a constant pitch at the central portion of the front projector screen 10.

In an embodiment of the present invention, the shape of each of the convex parts, that is, the gradient of the slope of each of the convex parts, is adjusted according to the position of the convex parts on the front projector screen 10 with the above-mentioned shape of the convex part as a reference, and the luminance distribution on the entire screen is made even by adjusting the diffusion characteristics of the diffusion layer at each position on the screen.

Figure 4:
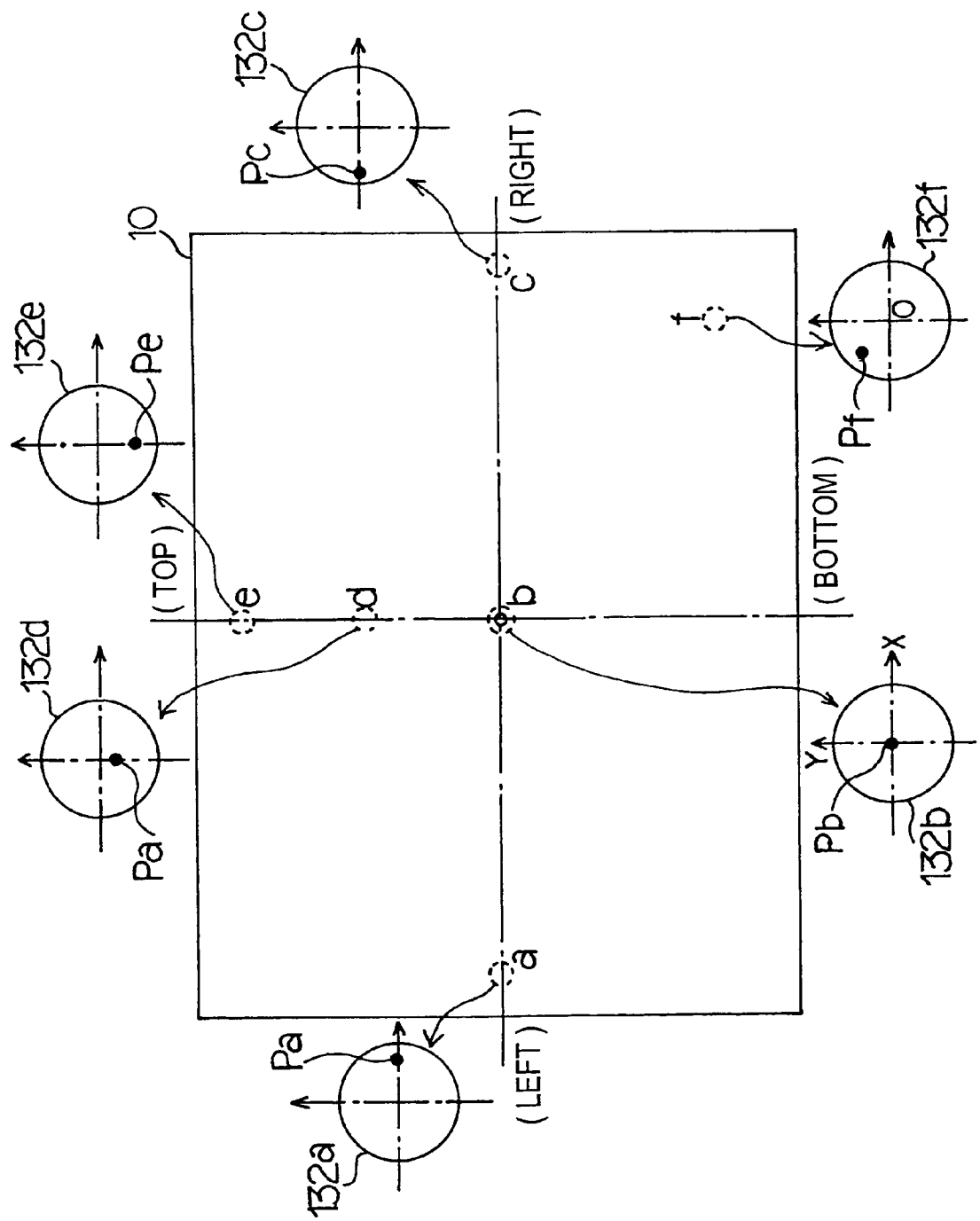
FIG. 4 is a schematic view showing the relationship between the position of the vertex of the convex parts of a diffusion layer above their circular bottom surfaces and the position of the convex parts on the screen in a front projector screen related to an embodiment of the present invention.

As an example, the relationship between the position of the convex parts on the front projector screen 10 and the position of the vertex of each of the convex parts is shown in FIG. 4.

As shown in FIG. 3, the vertex Pb is positioned right above the center of the circular bottom surface of the convex part at a central portion b of the screen 10. As the position of the convex part is shifted towards a peripheral portion of the screen 10, the position of the vertex above the circular bottom surface is shifted from the center of the bottom surface in the direction opposite the direction in which the convex section is shifted.

Figure 5:
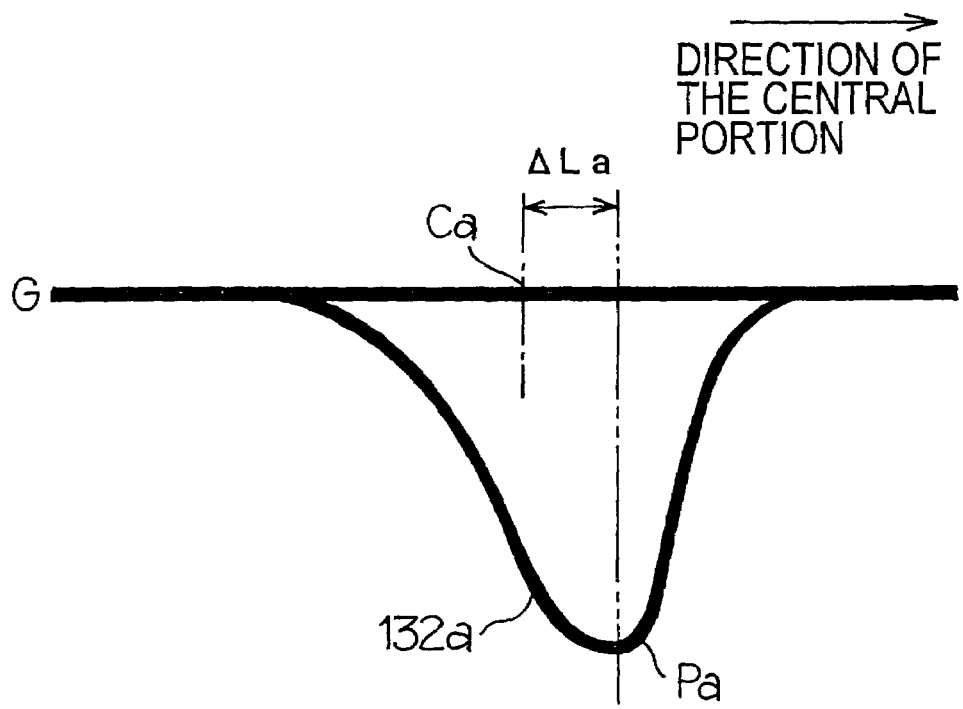
FIG. 5 is a sectional view showing the shape of a convex part disposed at the left side of a front projector screen in an embodiment of the present invention.

For example, if the circular bottom surfaces in FIG. 4 were to be expressed in two-dimensional X-Y coordinates, where the horizontal axis is taken to be the X-axis and the vertical axis is taken to be the Y-axis, the vertex Pa of the convex part placed at point a to the left of the central part b of the screen 10 is shifted to the right side (in the positive direction of the X-axis) of the center C of the circular bottom surface. FIG. 5 illustrates how the position of the vertex of that convex part is shifted. The shape of the cross-section of the convex part is an asymmetric chevron. The gradient of the slope closer to the central part b of the screen 10 (on the right side of the chevron) is greater than that of the slope on the other side. The gradient of this slope is made proportional to the distance from the central part b of the screen 10 (that is, the distance from the central part b to point a). Alternatively, the distance ΔLa, by which the vertex Pa is shifted from the center Ca of the circular bottom surface, may be made proportional to the distance by which the convex section is shifted from the central part b of the screen 10 to point a.

Figure 6:
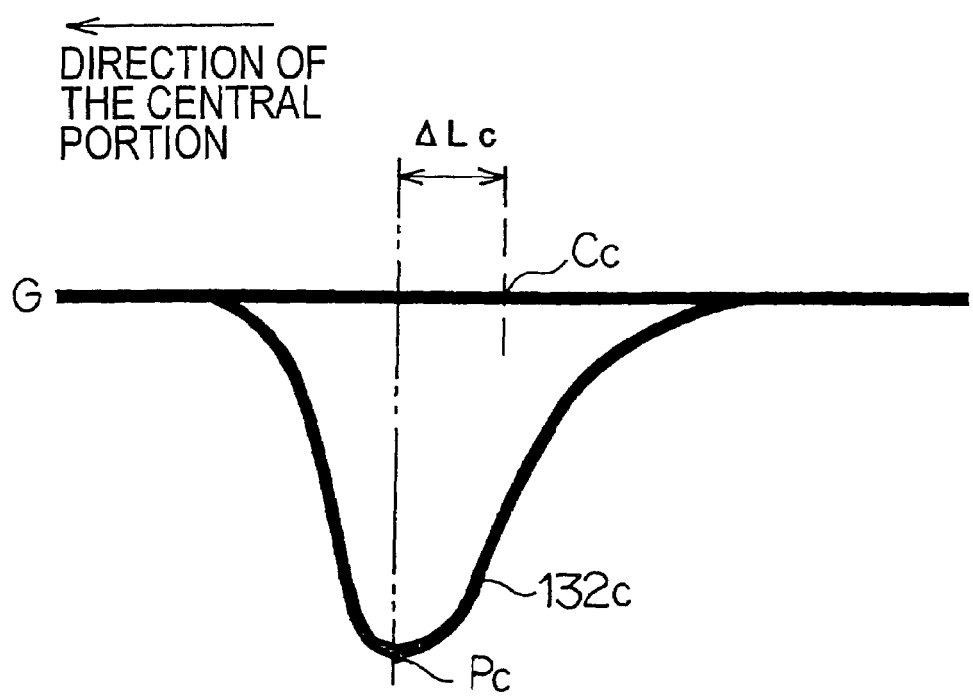
FIG. 6 is a sectional view showing the shape of a convex part disposed at the right side of a front projector screen in an embodiment of the present invention.

Regarding the convex part placed at point c to the right of the central part b of the screen 10, the relationship described above is reversed. In other words, as shown in FIG. 6, the cross section of the convex part 132c is a laterally asymmetric chevron. The gradient of the slope on the side of the central part b of the screen 10 (the left side of the chevron) is made greater. The gradient of this slope is made proportional to the distance from the central part b of the screen 10 (that is, the distance between the central part b and point c).

As described above, all the convex parts positioned away from the central part b of the screen 10 have the gradient of their slope closer to the central part b made larger than the reference gradient, and the gradient is made proportional to the distance by which they are shifted from the central part b of the screen 10.

For instance, when the convex part is shifted upward from the central part b of the screen 10, the position of the vertex above the circular bottom surface is shifted downward from the center of the bottom surface (that is, downward along the Y-axis (i.e., the negative direction)) thereby adjusting the gradient of the slope. In other words, the distance by which the vertex of the convex parts at points, for example, d and e is shifted from the center of their bottom surfaces is increased in proportion to their distance from the central part b, thereby increasing the gradient of their slopes that are closer to the central part b.

The direction in which the vertex above the circular bottom surface is shifted is not limited to the directions of the X-axis and the Y-axis. For example, when the convex part is placed at point f positioned to the lower-right of the central part b of the screen 10, the gradient of the slope on the upper left side is made larger.

The surface of the diffusion layer related to the present invention may include a plurality of convex parts or, alternatively, a plurality of concave parts as long as the gradient of the slopes of the concave or convex parts is adjusted in the manner described above. In addition, the gradient and the curvature of the slopes may be set according to the refraction index of the material of the diffusion layer and the desired luminance distribution on the screen.

It is necessary that the size of each of the convex parts or the concave parts and their pitch be sufficiently small as compared with the size of a pixel. Preferably, the pitch of the convex or concave parts, that is, the distance between adjacent convex or concave parts should be about 10 μm.

Because image failures, such as moiré images, sometimes occur due to interference of scattered reflection light when the convex parts or concave parts are arranged regularly on the screen, it is preferable that the convex parts or the concave parts be positioned randomly.

Figure 7:
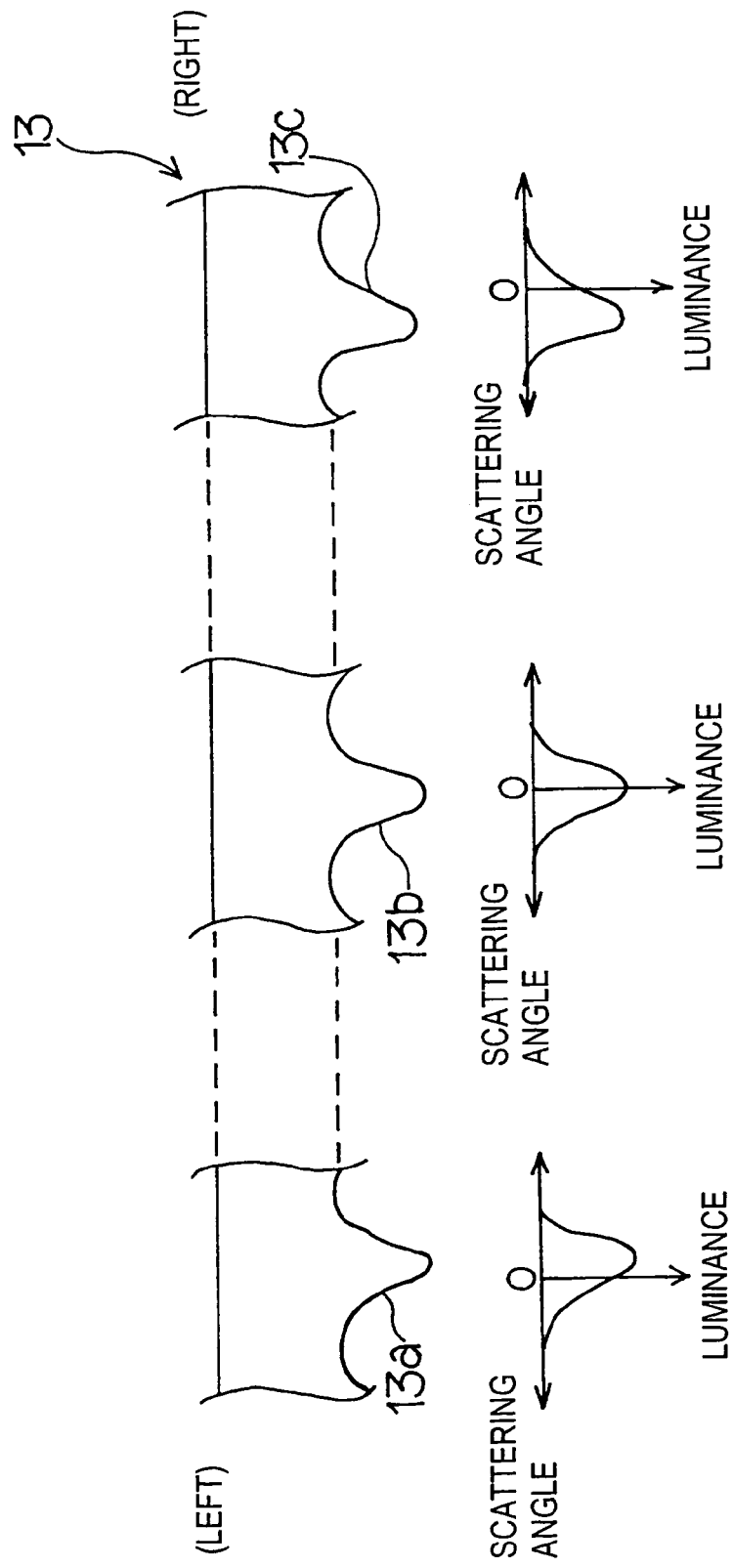
FIG. 7 is a schematic view showing the relationship between the shape of the convex parts of the diffusion layer and the diffusion characteristics thereof.

FIG. 7 shows the diffusion characteristics of reflection light from the diffusion layer 13 in which the position of the vertexes of the convex parts are adjusted in the manner described above. This figure shows diffusion characteristics of convex parts 13a, 13b, and 13c positioned at the left side, the central part, and the right side of the screen 10, respectively.

Figure 18A:
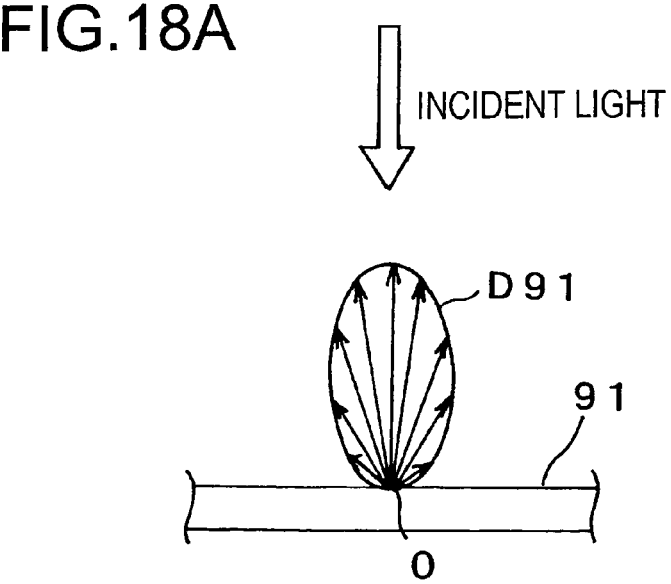
FIGS. 18A and 18B are schematic views showing the state of diffusion and the diffusion characteristics of reflection light with respect to light incident on a convex part of a conventional diffusion layer.
Figure 18B:
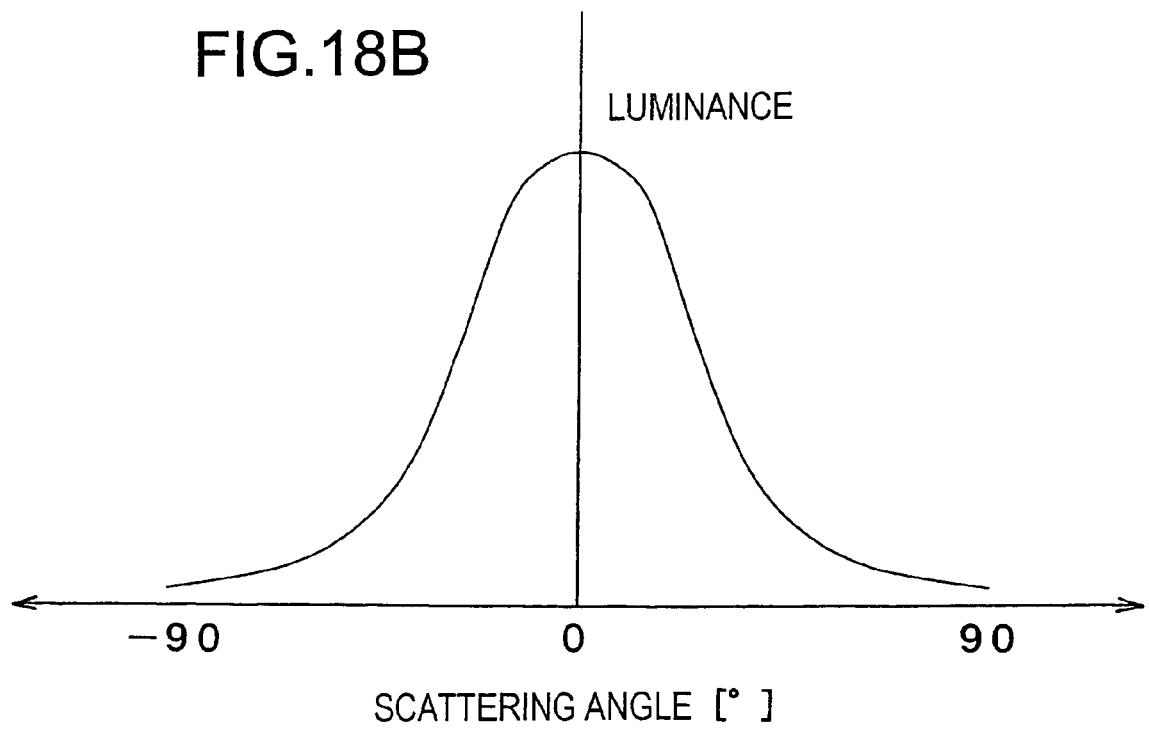
Figure 19:
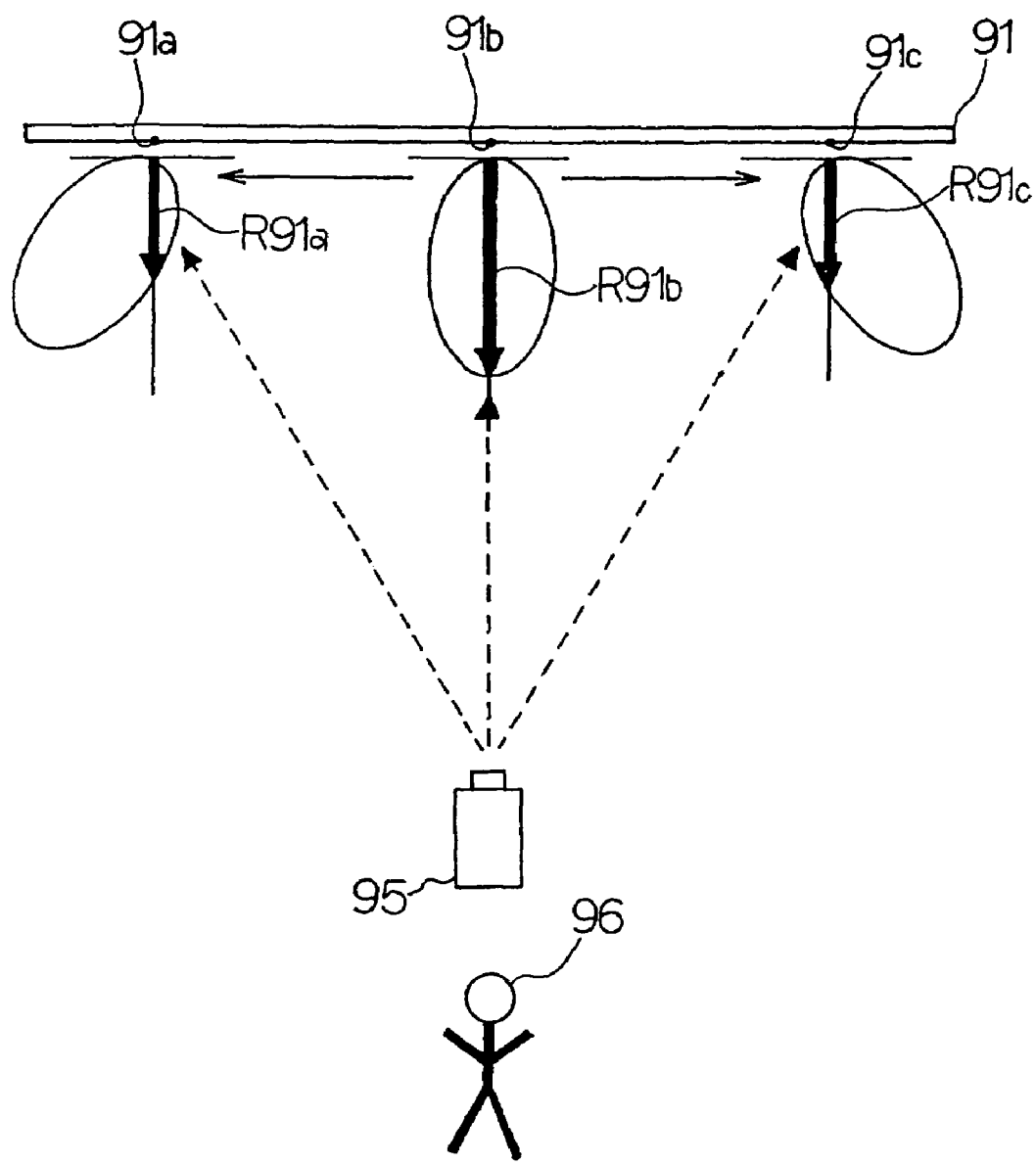
FIG. 19 is a schematic view showing the luminance distribution of reflection light from a conventional front projector screen.
Figure 20:
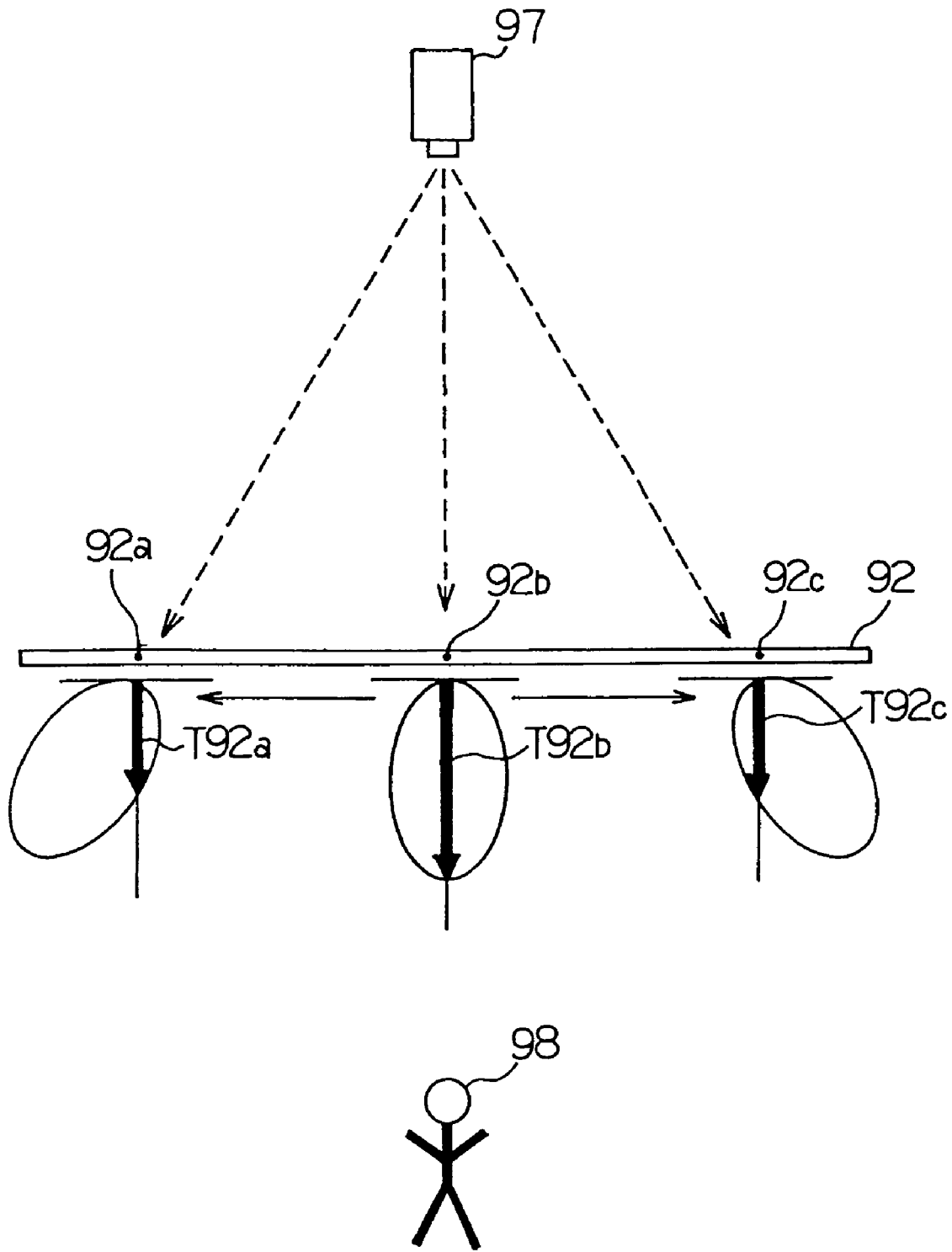
FIG. 20 is a schematic view showing the luminance distribution of light transmitted through a conventional rear projector screen.

The diffusion characteristic of the convex part 13b provided at the central part of the screen 10 shows a curve whose luminance is highest at a scattering angle of 0° as in the diffusion characteristics shown in FIG. 18B. As opposed thereto, the diffusion characteristics of the convex parts 13a and 13c positioned at the left side and the right side of the screen 10, respectively, are such that the peak luminance is shifted towards a greater value of scattering angle in the direction of the central part of the screen 10.

In other words, a front projector screen related to an embodiment of the present invention may have a characteristic where, when the diffusion characteristics of the screen as a whole are considered, all peripheral parts (upper, lower, left and right) have diffusion characteristics where the peak of the luminance distribution of reflection light is shifted towards greater values of scattering angle in the direction of the central part of the screen 10, and there is a tendency for this shift to become larger in a continuous manner the greater the distance from the center portion of the screen is.

Figure 8:
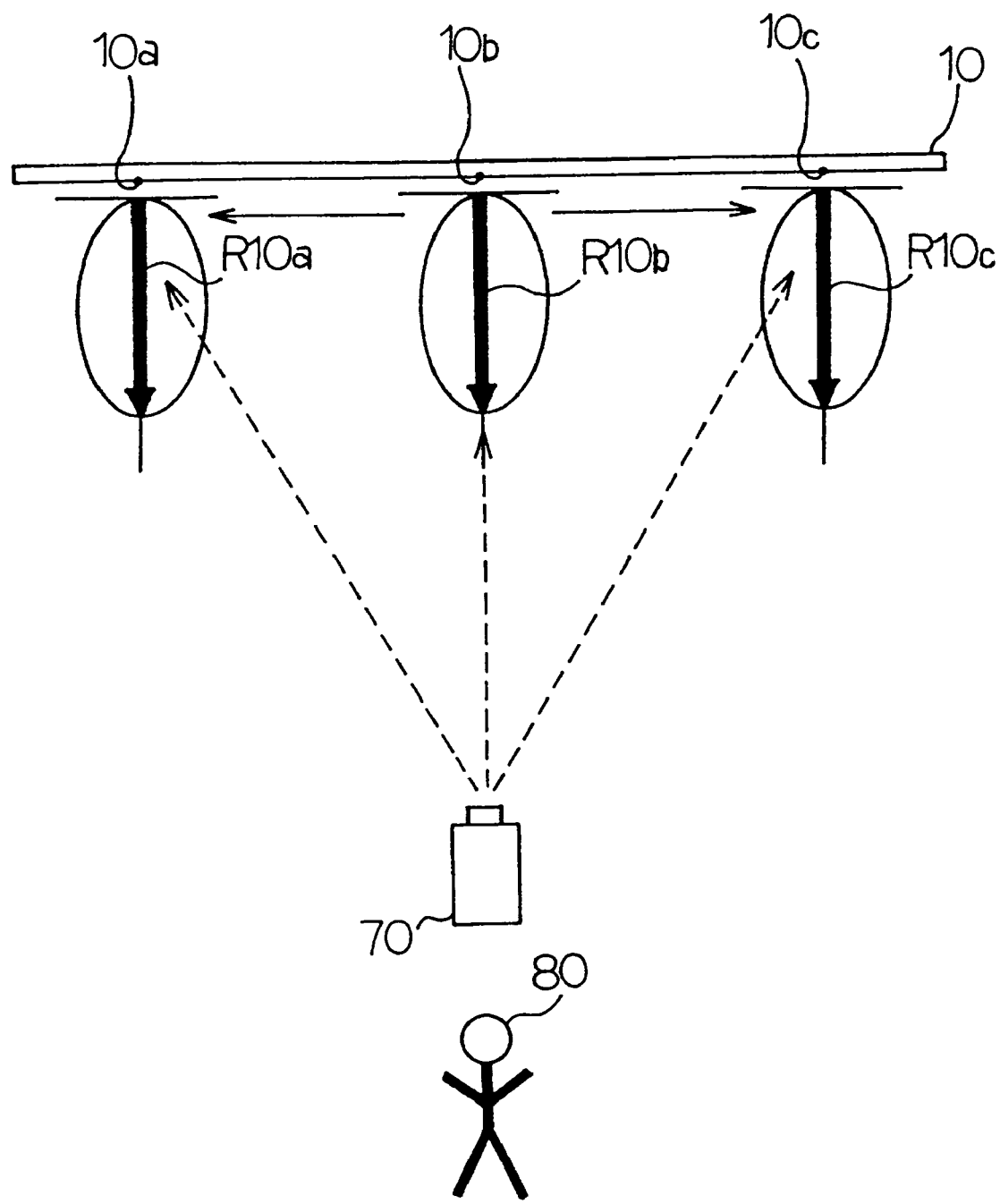
FIG. 8 is a schematic view showing the luminance distribution of reflection light from a front projector screen related to an embodiment of the present invention.
Figure 9:
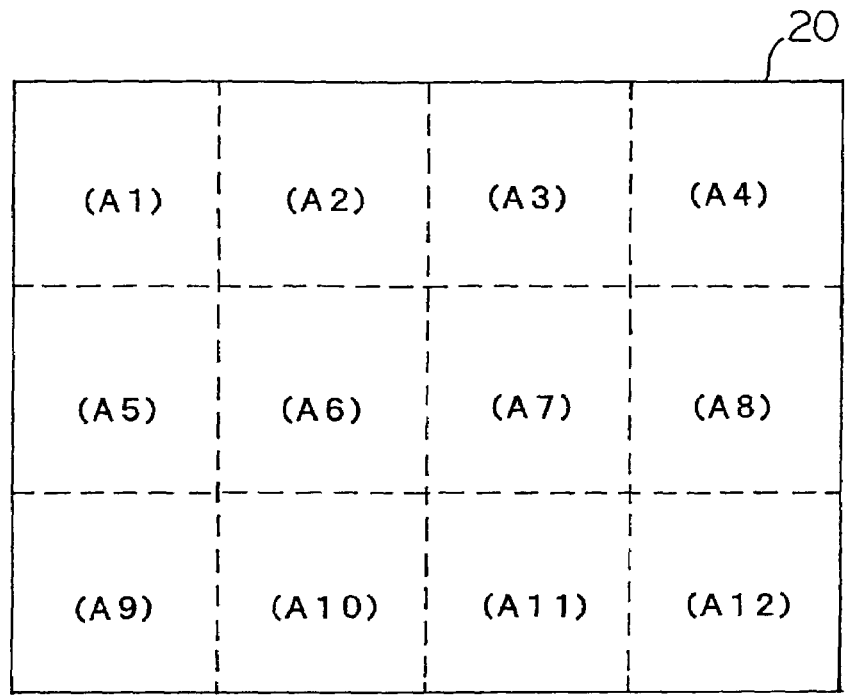
FIG. 9 is a schematic view showing the configuration of a modification of the front projector screen of the first embodiment of the present invention.

FIG. 8 shows how light is reflected when the front projector screen 10 having such diffusion characteristics is actually used.

When light is projected from a light source 70 onto the screen 10, since the luminance distribution of scattered reflection light is biased towards the central part of the screen according to the scattering characteristics, the distribution of scattered reflection light at the peripheral parts of the screen is similar to that at the central part of the screen, whereas in the conventional screen, a large portion of the scattered reflection light at the peripheral parts is directed outward. In other words, with respect to all of the left-side part 10a, the central part 10b, and the right-side part 10c, angular components R10a, R10b, and R10c each having the highest light intensity of the light reflected therefrom are returned to the side of the viewer 80. Thus, the luminance distribution across the entire screen is made even at a high level.

The foregoing description of the present invention describes an embodiment in which the gradient of the slope of each of the convex parts changes in a continuous manner as the distance between the central part of the screen and each of the convex parts increases. Alternatively, a screen 20 may be divided evenly in the vertical and horizontal directions into areas A1 to A12 and the shapes of convex parts may be made uniform within each of the areas while the gradient of the slope of each of the convex parts are adjusted to vary between the areas. Since the luminance difference between the areas will become apparent if the diffusion characteristics are altered drastically between the areas, and the image will therefore look mosaic-like, it is necessary that the size of the areas be small enough so that the luminance difference will not noticeable.

The front projector screen 10 described above related to the present invention is manufactured in, for example, the following way.

As the screen substrate, a screen substrate 11 of a PET film is prepared. A reflective layer 12 comprised of an aluminum layer is formed on one of the surfaces of the screen substrate 11. If an aluminum layer is used as described above, the reflective layer 12 is formed by vacuum evaporation, sputtering, or the like.

On the other hand, a UV curable epoxy resin liquid is coated to a predetermined thickness on another substrate of PET film. A master mold having predetermined concave and convex shapes formed thereon in advance is placed on the resin liquid layer, and embossing is performed by applying a constant pressure. Thereafter, ultraviolet light is irradiated thereon to thereby harden the UV resin liquid layer. Thus, an optical film to serve as the diffusion layer 13 is formed. The concave and convex shapes to be formed on the master mold is the mirror image of the convex parts, whose gradient of the slope is adjusted according to the position of the convex parts, on the screen 10 described in the embodiment above.

The diffusion layer 13 formed in this manner is adhered onto the surface of the screen substrate 11 on which the reflective layer 12 is formed to thereby produce the front projector screen 10 related to an embodiment of the present invention.

Next, another front projector screen related to an embodiment of the present invention is described.

Figure 10:
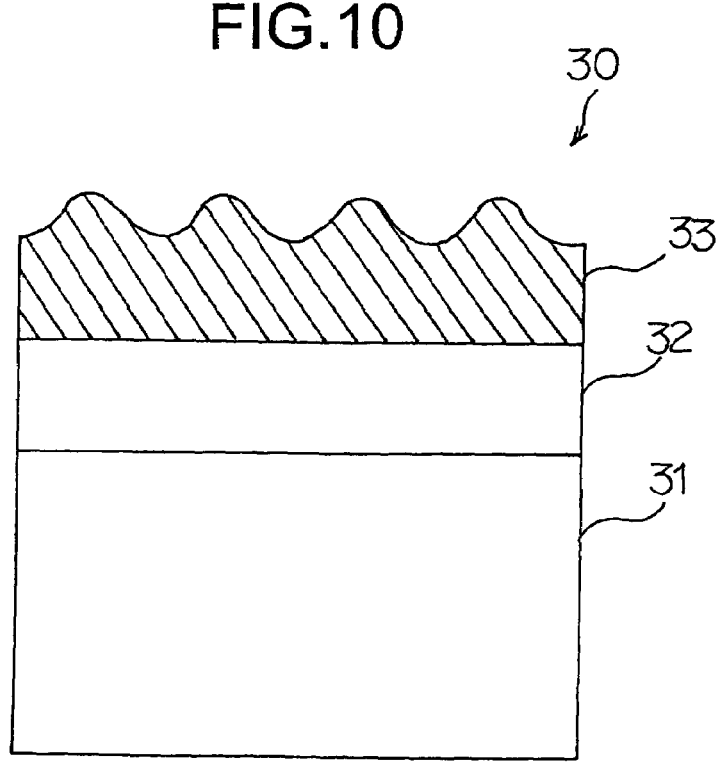
FIG. 10 is a sectional view showing the configuration of a front projector screen according to an embodiment of the present invention.

FIG. 10 is a sectional view showing the configuration of this embodiment of a front projector screen. The configuration of a screen 30 according to the present embodiment is obtained by replacing the reflective layer 12 in FIG. 1 with a selective reflective layer 32. A diffusion layer 33 is formed on the selective reflective layer 32. An absorption layer for absorbing light transmitted through the selective reflective layer 32 is formed on or in the screen substrate 31. This absorption layer is formed by applying a black paint onto a surface of the substrate or by having black microparticles be contained in the substrate.

Figure 11:
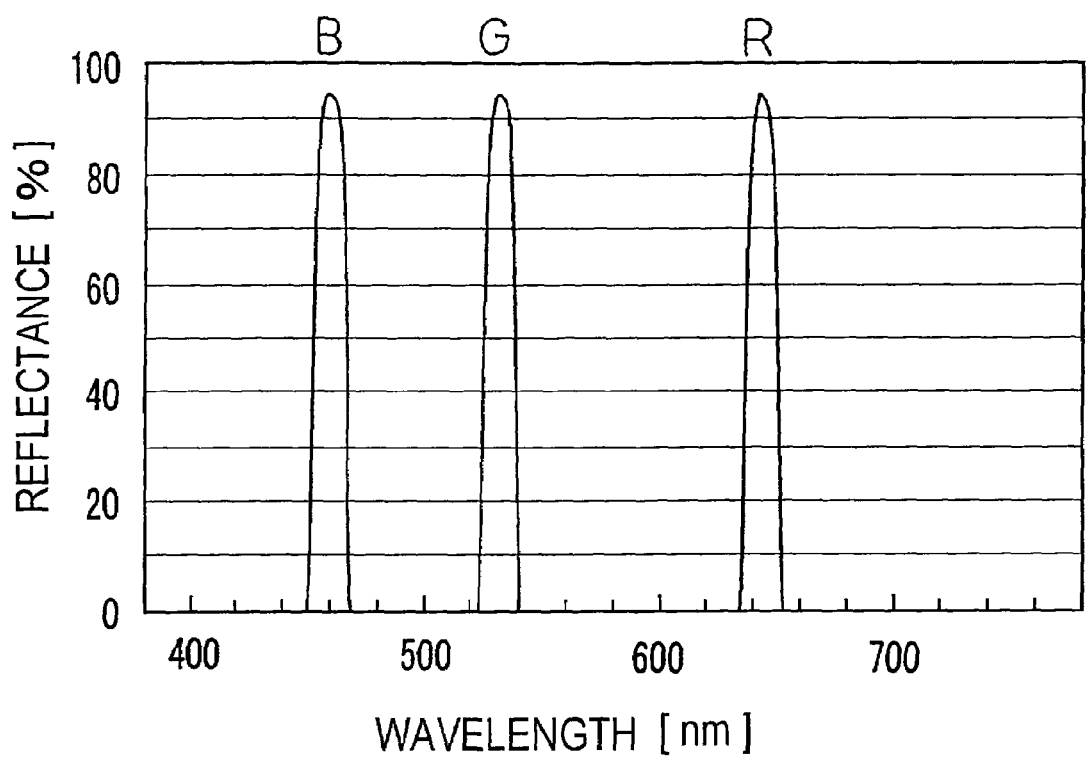
FIG. 11 is a graph showing the spectral reflectance characteristics of a selectively reflective layer used in a front projector screen related to the present invention.

The selectively reflective layer 32 is an optical thin film that has properties where light in the wavelength range of projector light, for instance, light in the wavelength ranges of the three primary colors red (R), green (G), and blue (B), is reflected and light that is not within the wavelength ranges of the three primary colors is transmitted. For example, an optical multilayer film proposed in Japanese Patent Application No. 2002-070572 may be used as the selective reflective layer 32. This optical multilayer film includes alternately stacked high-refractive-index layers and low-refractive-index layers and is designed in such a way as to selectively reflect light of a specific wavelength range, such as the wavelength ranges of the three primary colors, as shown in FIG. 11.

In manufacturing a front projector screen related to this embodiment of the present invention, the step of forming the reflective layer mentioned in the previous manufacturing method is replaced with the step of forming the selective reflective layer by a vacuum thin film forming method, such as evaporation or sputtering, or by a coating method using a solvent. In the case of the vacuum thin film forming method, the selective reflective layer is formed by alternately stacking high-refractive-index layers made of a high-refractive-index material, such as $TiO_2$, $Nb_2O_5$, $Ta_2O_5$ or the like, and low-refractive-index layers made of a low-refractive-index material, such as $SiO_2$, $MgF_2$ or the like through, for example, AC sputtering. In so doing, the thickness of each of the layers is preliminarily designed according to the wavelength range of the light to be used. Alternatively, in the case of the coating method, thermosetting resins having different refractive indices, for example, are used for the high-refractive-index layers and the low-refractive-index layers.

This screen 30 enables, when, for example, light from an RGB light source of a diffraction grating projector using a grating light valve (GLV) is projected thereon, viewers to view high-contrast images with less interference from external light and whose luminance distribution on the screen 30 is even. Similar effects can still be obtained when the selectively reflective layer 32 is an optical thin film that reflects light of a specific wavelength range and absorbs light of wavelength ranges other than the specific range mentioned above.

Next, another front projector screen related to an embodiment of the present invention is described below.

Figure 12:
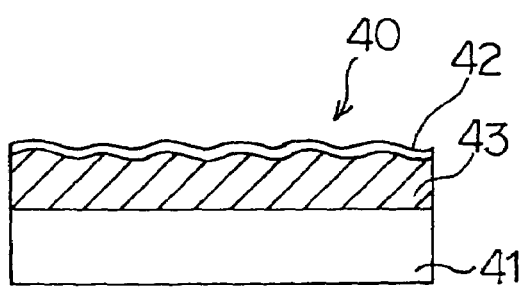
FIG. 12 is a sectional view showing the configuration of a front projector screen related to an embodiment of the present invention.

FIG. 12 is a sectional view showing the configuration in this embodiment of the present invention. The configuration of a screen 40 is such that the arrangement of the reflective layer 12 and the diffusion layer 13 shown in FIG. 1 is switched, that is, a reflective layer 42 is formed on a diffusion layer 43. The materials, the form and the properties of each of a screen substrate 41, the diffusion layer 43, and the reflective layer 42 are the same as those of the corresponding layers described with reference to FIG. 1.

A method of manufacturing the front projector screen according to this embodiment of the present invention is one in which merely the order in which the step of forming the reflective layer and the step of forming the diffusion layer are performed in the previously described manufacturing method is switched.

In this screen 40, the surface of the reflective layer 42 reflects the concave and convex form of the surface of the diffusion layer 43. Since reflection light is scattered according to the shape of the surface thereof, the luminance distribution on the screen 40 is improved.

Next, another front projector screen related to an embodiment of the present invention is described below.

Figure 13:
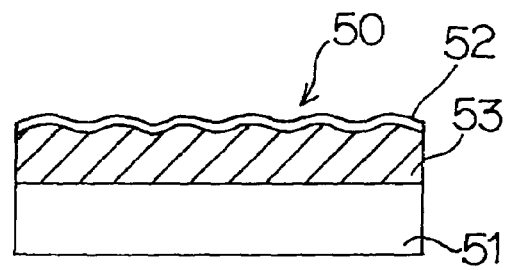
FIG. 13 is a sectional view showing the configuration of a front projector screen related to an embodiment of the present invention.

FIG. 13 is a sectional view showing the configuration in this embodiment of the present invention. The configuration of a screen 50 is such that the arrangement of the selectively reflective layer 32 and the diffusion layer 33 shown in FIG. 10 is switched, that is, a reflective layer 52 is formed on a diffusion layer 53. The materials, the form and the properties of each of a screen substrate 51, the diffusion layer 53, and the selectively reflective layer 52 are the same as those of the corresponding layers described with reference to FIG. 10.

A method of manufacturing the front projector screen according to this embodiment of the present invention is one in which merely the order in which the step of forming the selectively reflective layer and the step of forming the diffusion layer are performed in the previously described manufacturing method related to FIG. 10 is switched.

In this screen 50, the surface of the selectively reflective layer 52 reflects the concave and convex form of the surface of the diffusion layer 53. Since reflection light is scattered according to the shape of the surface thereof, the luminance distribution on the screen 50 is improved.

Next, a rear projector screen related to an embodiment of the present invention is described below with reference to the accompanying drawings.

Figure 14:
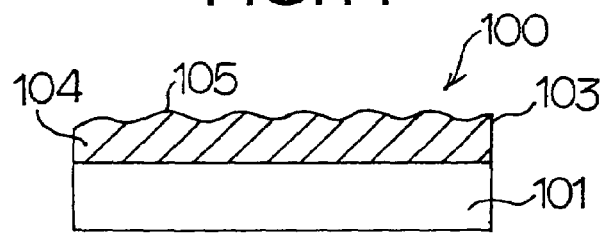
FIG. 14 is a sectional view showing the configuration of a rear projector screen related to an embodiment of the present invention.

FIG. 14 is a sectional view showing the configuration in this embodiment of the present invention. As shown in FIG. 14, a rear projector screen 100 has a configuration in which a diffusion layer 103 is provided on a screen substrate 101.

The screen substrate 101 functions as a support member of the rear projector screen, and may be comprised of polymers, such as, for example, polyethylene terephthalate (PET), polyethylene naphthalate (PEN), polyether sulfone (PES), and polyolefin (PO) and the like.

The diffusion layer 103 is comprised of a flat layer 104 and a plurality of convex parts 105 formed on one side of the flat layer 104. The flat layer 104 and the convex parts 105 are made of the same material. The diffusion layer 103 produces scattered light by scattering light that is transmitted through a selectively absorptive layer 101. The diffusion layer 103 is made of a light-transmissive material, such as, for example, an epoxy resin. A viewer is able to view a natural image by observing the scattered light.

The shape of the surface of this diffusion layer 103 is similar to that of the surface of the diffusion layer in a front projector screen. The surface of the diffusion layer 103 has concave and convex parts due to the convex parts 105. In the present invention, the luminance distribution on the screen as a whole is made even by adjusting the shape of the convex parts 105 according to the position of the convex parts 105 on the rear projector screen 100 to thereby adjust the diffusion characteristics of the diffusion layer according to the position on the screen.

The same principles as those of the convex sections on the diffusion layer of a front projector screen as mentioned above apply in adjusting the shape of the convex parts 105. In other words, the convex parts provided at the central portion of the screen 100 have an even gradient that is taken to be the reference gradient. All the convex parts placed away from the central portion of the screen 100 are so formed that, of the slopes of each of the convex parts, the slope closer to the central portion has a gradient that is larger than the reference gradient, and that the gradient is made proportional to the distance by which the convex part is shifted from the central portion of the screen 100.

Thus, the rear projector screen 100 to which the diffusion layer 103, of which the gradient of the slopes of the convex parts are adjusted, is applied has such a characteristic where the diffusion characteristics of all the peripheral parts (upper, lower, left and right) are such that the peak of the luminance distribution of transmitted light is biased in the direction of the central portion of the screen 100. This rear projector screen 100 exhibits a tendency for the bias to become larger in a continuous manner the greater the distance by which the convex part is shifted away from the central portion of the screen is.

Figure 17:
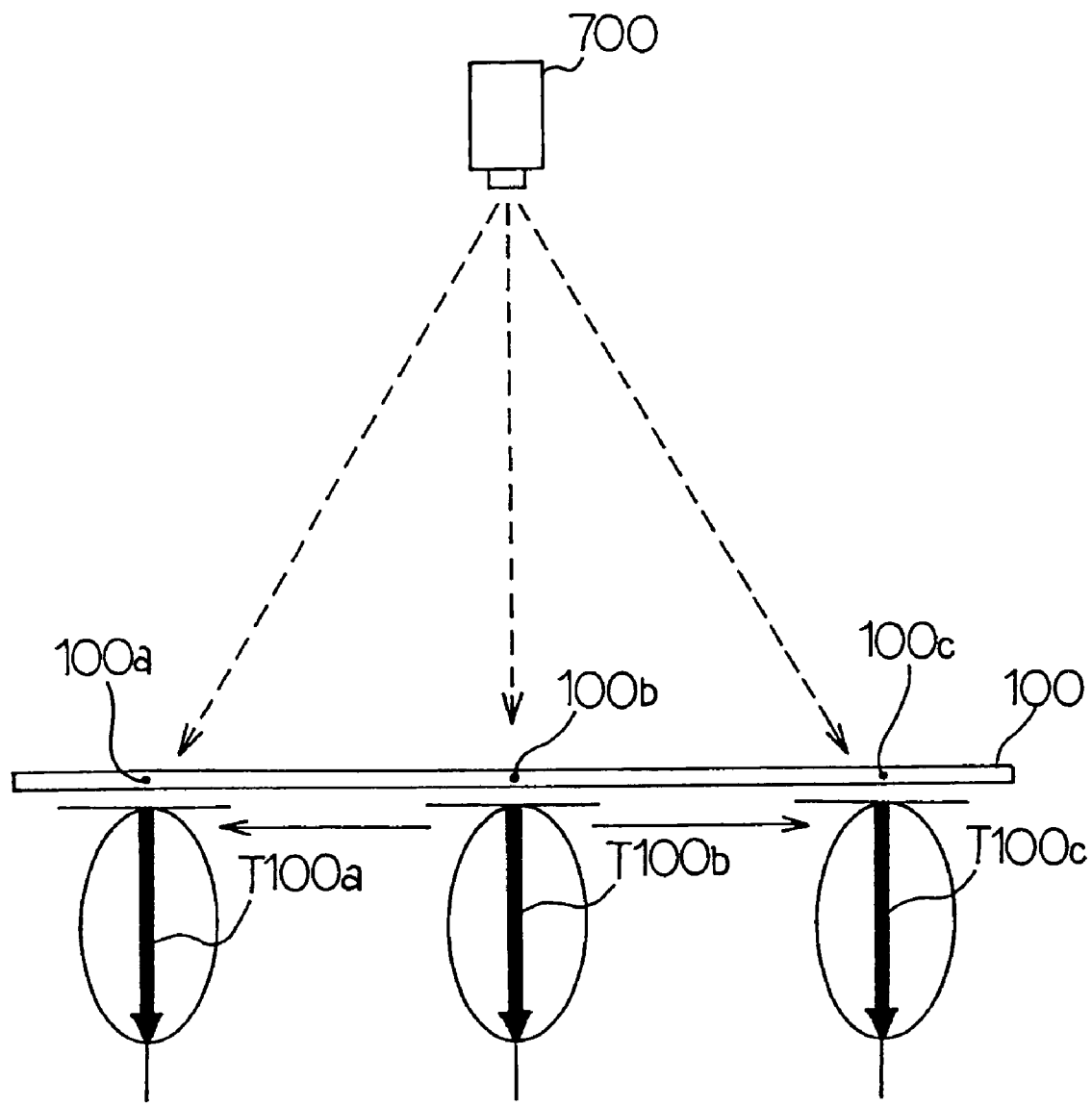
FIG. 17 is a schematic view showing the luminance distribution of light transmitted through a rear projection screen related to an embodiment of the present invention.

FIG. 17 shows how light is transmitted when the rear projector screen 100 having such diffusion characteristics is actually used.

When light is projected from a light source 700 onto the screen 100, the luminance distribution of scattered and transmitted light is biased towards the central portion of the screen according to the diffusion characteristics, whereas in the conventional screen, a substantial portion of the transmitted light is directed outward at its peripheral portions. Consequently, the luminance distribution of the scattered and transmitted light at the peripheral portions of the screen is similar to that of the central portion. In other words, with respect to all of the left-side portion 100a, the central portion 100b, and the right-side portion 100c, angular components T100a, T100b, and T100c, each having a light intensity that is the highest of the transmitted light therefrom, are returned to the side of a viewer 800. Thus, the luminance distribution across the entire screen is made even at a high level.

The foregoing description of the present invention describes an embodiment in which the gradient of the slope of each of the convex parts is gradually changed as the distance between the central portion of the screen and each of the convex parts increases. However, the present invention is not limited as such, and the screen, for example, may be divided evenly in the vertical and horizontal directions into a plurality of areas where the shape of the convex parts within an area is made uniform while the gradient of the slope of the convex parts is varied between the areas.

As described in the foregoing description related to FIG. 1, the rear projector screen 100 related to the present invention is manufactured by adhering the diffusion layer 103, which is separately formed on a film, onto one of the surfaces of the screen substrate 101 comprised of, for instance, a PET film.

Next, another rear projector screen related to an embodiment of the present invention is described below.

Figure 16:
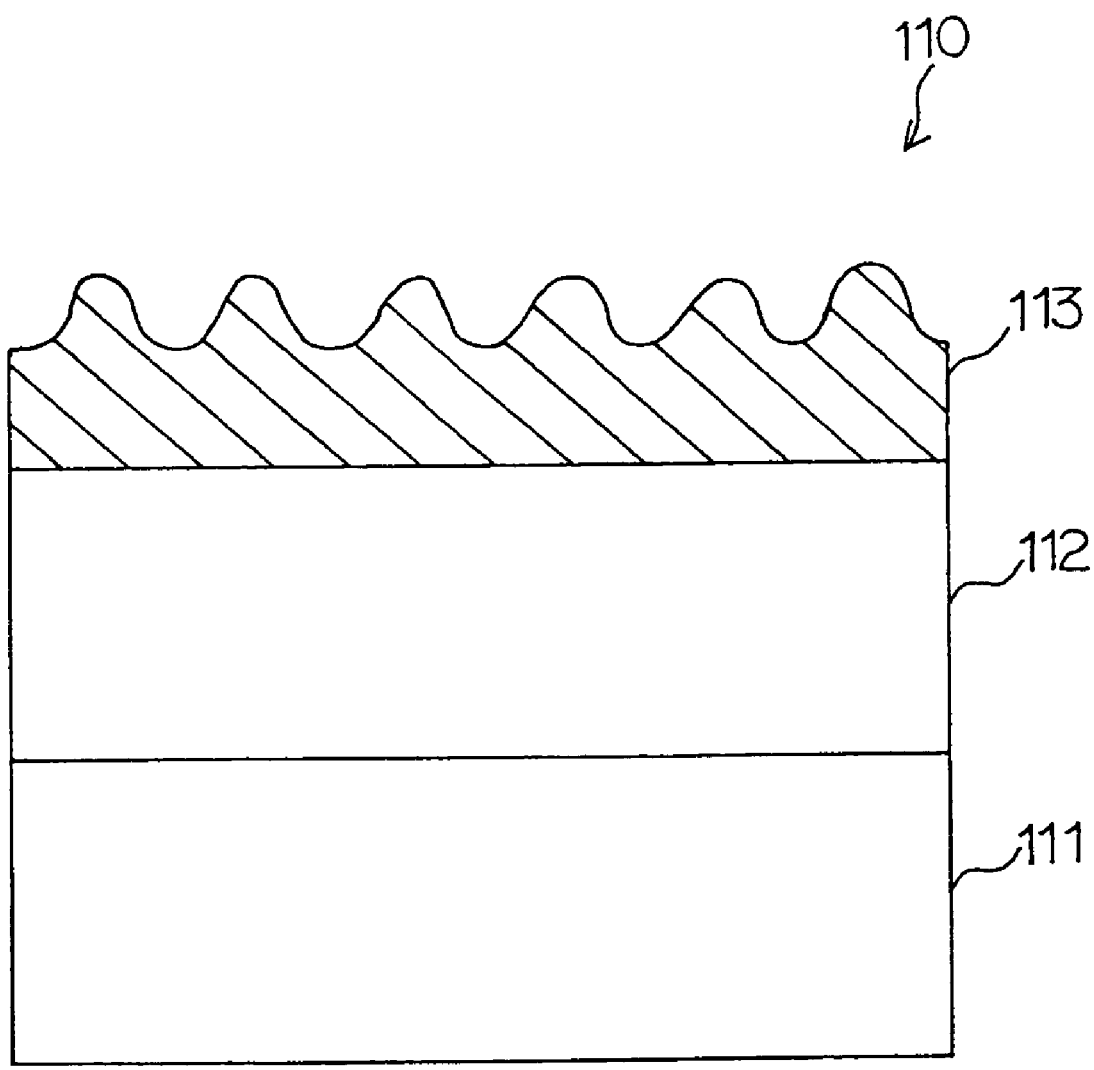
FIG. 16 is a sectional view showing the configuration of a rear projector screen related to an embodiment of the present invention.

FIG. 16 is a sectional view showing the configuration in this embodiment of the present invention. A screen 110 is configured by adding, in addition to the configuration of the embodiment shown in FIG. 14, a selective absorptive layer 112 between a screen substrate 111 and a diffusion layer 113. The screen substrate 111 and the diffusion layer 113 are similar to the corresponding layers found in the embodiment shown in FIG. 14.

Figure 15:
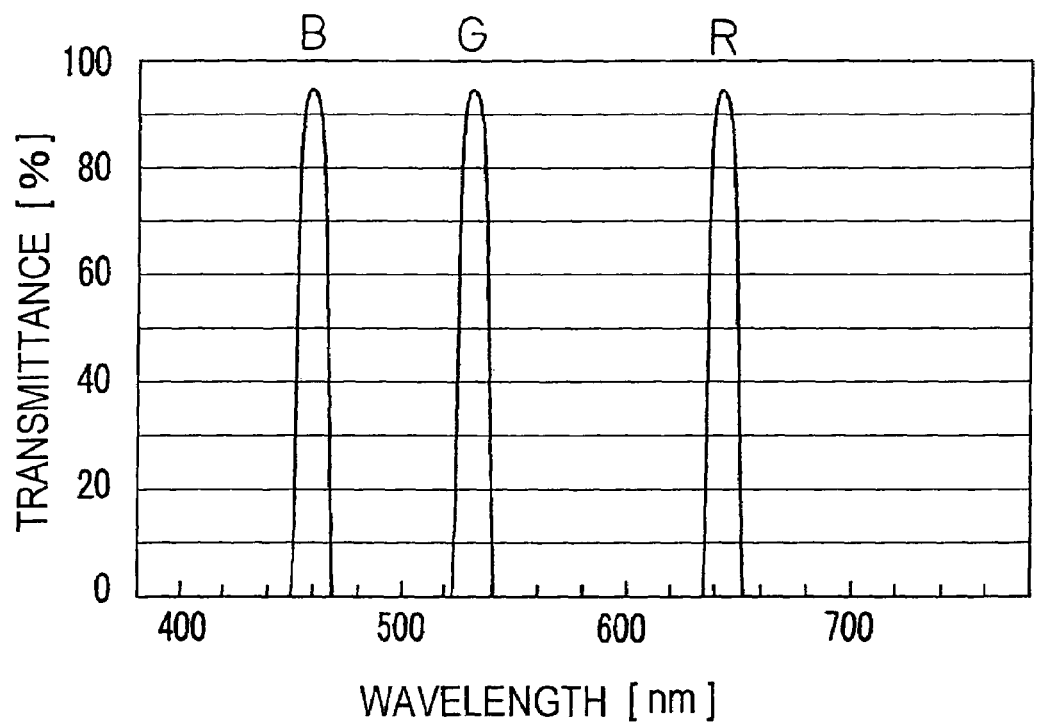
FIG. 15 is a graph showing the spectral luminance distribution of light transmitted through the rear projector screen related to an embodiment of the present invention.

The selective absorptive layer 112 has properties where light of a specific wavelength range, for instance, the wavelength ranges of the three primary colors is transmitted, while light of wavelength ranges not within the specific wavelength range mentioned above is absorbed. For example, as shown in FIG. 15, the selectively absorptive layer 112 transmits light of the wavelength ranges of the three primary colors red (R), green (G), and blue (B), and absorbs light of wavelength ranges not within the ranges of the three primary colors. For example, the optical film proposed in Japanese Patent Application No. 2002-331993 is used as the selective reflective layer 32. This optical film is obtained by dispersing a selectively absorptive dye having absorbing properties for a certain wavelength range(s) outside of a specific wavelength range(s), and transmitting properties for all other wavelength ranges. This optical film can be formed by a coating method using a resin binder.

The rear projector screen 110 related to the present invention is manufactured by forming the selective absorptive layer 112 on the screen substrate 111 in, for instance, the following way.

The selective absorptive layer 112 is formed by first preparing a coating material using, with a UV curable resin as a binder, DIARESIN Yellow F (trademark, produced by Mitsubishi Chemical Corporation), which has an absorption peak in the wavelength range of 410 nm to 430 nm, DIARESIN Red S (trademark, also produced by Mitsubishi Chemical Corporation.), which has an absorption peak in the wavelength range of 470 nm to 530 nm, a Squarylium dye, which is described in Japanese Patent Application Publication No. 2002-228829 and has an absorption peak in the wavelength range of 560 nm to 620 nm, and a dye described in Japanese Patent No. 3,308,545, which shows high absorption in the wavelength range equal to or greater than 800 nm. The coating material is applied on one of side of a PET film, which serves as the screen substrate 111, by a spin-coating method. Ultraviolet light is irradiated thereon to thereby cure the UV curable resin.

Subsequently, the diffusion layer 113, which is separately formed as described above, is adhered onto the selective absorptive layer 112. Thus, the rear projector screen 110 is obtained.

A front projector screen can be obtained with the above-mentioned configuration by providing a reflective layer between the screen substrate 111 and the selective absorptive layer 112.

This screen 110 enables viewers to view high-contrast images that have an even luminance distribution on the screen 10, without interference from outside light when light is projected from behind the screen from an RGB light source of a diffraction grating projector using a grating light valve (GLV).

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A screen for displaying an image by having image light projected thereonto, comprising:

a diffusion layer whose diffusion characteristics expressed as a luminance distribution with respect to a scattering angle of incident light incident thereon at an incident angle of 0° vary in such a manner that the peak position of the luminance distribution is shifted towards a greater value of scattering angle in the direction of a central portion of said screen as the distance from said central portion of said screen increases; and wherein said diffusion layer has a plurality of convex or concave parts provided on a surface thereof for scattering image light, and wherein a gradient of a slope, which is closer to said central portion of said screen, of each of said convex or concave parts becomes larger as the distance between said convex or concave parts and said central portion of said screen increases, wherein the size of each of said convex or concave parts and the interval therebetween are smaller than the size of a pixel, further comprising a reflective layer for reflecting image light; and wherein said reflective layer has a highly reflective property for light of a specific wavelength range corresponding to image light, and wherein said reflective layer has one of a highly transmissive property and a highly absorptive property for at least light in the visible wavelength range outside said specific wavelength range.

2. The screen according to claim 1, wherein said reflective layer comprises a multilayer film in which high refractive index layers and low refractive index layers, whose refractive index is lower than that of said high refractive index layers, are alternately stacked.

3. The screen according to claim 1, further comprising an absorption layer for absorbing light transmitted through said reflective layer.

* * * * *